United States Patent [19]
Hentschel

[11] Patent Number: 5,266,260
[45] Date of Patent: Nov. 30, 1993

[54] METHOD OF AND DEVICE FOR PRODUCING A HOLLOW COLUMNAR PIECE

[75] Inventor: Martin Hentschel, Mainbernheim, Fed. Rep. of Germany

[73] Assignee: REAL GmbH, Mainbernheim, Fed. Rep. of Germany

[21] Appl. No.: 882,794

[22] Filed: May 14, 1992

[30] Foreign Application Priority Data

May 14, 1991 [DE] Fed. Rep. of Germany ....... 4115609

[51] Int. Cl.$^5$ ............................................ B29C 47/20
[52] U.S. Cl. ................... 264/310; 156/244.11;
264/45.5; 264/209.2; 264/211.21; 264/297.6;
264/323; 264/334; 425/319; 425/325;
425/378.1; 425/381; 425/393; 425/403;
425/438; 425/467
[58] Field of Search ............. 156/244.11–244.14,
156/500; 264/323, 310, 209.8, 209.2, 209.1,
334–335, 211.21, 45.5, 297.6; 425/380–381, 467,
319, 817 R, 817 C, 325, 392, 393, 403, 403.1, 71,
378.1, 438

[56] References Cited

U.S. PATENT DOCUMENTS

| | | | |
|---|---|---|---|
| 2,400,055 | 5/1946 | Wallace | 425/467 |
| 2,666,947 | 1/1954 | Shaw | 264/209.8 |
| 3,234,597 | 2/1966 | Peborgh | 425/380 |
| 3,366,718 | 1/1968 | Komada | 264/310 |
| 3,407,440 | 10/1968 | Myers, Jr. | 425/319 |
| 3,870,451 | 3/1975 | Gokcen | 425/467 |
| 4,187,352 | 2/1980 | Klobbie | 425/817 R |
| 4,738,808 | 4/1988 | Hammer et al. | 264/323 |

FOREIGN PATENT DOCUMENTS

3341438  6/1985  Fed. Rep. of Germany .

Primary Examiner—Jeffery Thurlow
Attorney, Agent, or Firm—Sprung Horn Kramer & Woods

[57] ABSTRACT

A method of the device for producing a hollow columnar piece whereby a blend of essentially thermoplastic particles is melted into a billet, introduced into a mold, looped into layers inside the mold, and transformed into a piece, subsequent to which the piece is solidified by cooling and removed. The billet (3) is rotated around its axis and concentric with its face as it is introduced into a mold (4), the mold accommodates a core (20), space is left between the core and the inner surface (6) of the mold, the billet is laid along the circumference of the space, and the billet continues to be introduced into the space until the mold's inner surface and core are uniformly and continuously wet with constituents of the billet.

24 Claims, 5 Drawing Sheets

METHOD OF AND DEVICE FOR PRODUCING A HOLLOW COLUMNAR PIECE

BACKGROUND OF THE INVENTION

The invention concerns a method of producing a columnar piece whereby a blend of essentially thermoplastic particles is melted into a billet, introduced into a mold, looped into layers inside the mold, and transformed into a piece, subsequent to which the piece is solidified by cooling and removed.

A method of this type is known from German Patent 3 341 438. The thermoplastic material melted in an extruder and transformed into a flexible paste-like strand or "billet" is expanded once it has left the extruder and comes to rest between two open-mesh belts departing from the extruder's outlet. The ratio of the speed at which the billet arrives to that at which the belts travel is adjusted to essentially match the ratio of the distance between the belts to the thickness of the billet. The density of the resulting slab of plastic foam will accordingly essentially equal that of the expanded billet. It is consequently low, and a slab of this type cannot be employed as a static bearing element. The moving belts also make the device needed to carry out the process complicated and sensitive. The products can also essentially only be slabs. The attainable rate of production is, due to the impossibility of diverting heat more rapidly, very low.

SUMMARY OF THE INVENTION

The object of the present invention is to improve a method of the aforesaid type to the extent that outstandingly strong columnar pieces of any desired cross-section and can be produced comparatively rapidly.

This object is attained in accordance with the present invention in a method.

Whereby the billet is rotated around its axis and concentric with its face as it is introduced into a mold. The mold accommodates a core. Space is left between the core and the inner surface of the mold. The billet is laid along the circumference in the space. The billet continues to be introduced until the mold's inner surface and core are uniformly and continuously wet with constituents of the billet. Various forces act on the billet while it is being introduced into the mold. Its forward end will accordingly, and due to its satisfactory plastic deformability subsequent to introduction into the mold, sag and come into contact with the latter's inner surface and/or face, resulting in a certain level of mutual adhesion. The billet will accordingly begin to rotate as well as advance. The subsequently introduced constituents of the billet will accordingly constantly and continuously be brought into contact along the circumference inside the mold, resulting in mutual adhesion, initially with the inner surface and then with the already deposited constituents of the billet until the available space between the deposited constituents and the outlet from the extruder is completely occupied. The billet, as it continues to enter in the same mode will now occasion a relative displacement and replacement of the constituents already deposited in the space to the extent that the original adhesion between the billet and the inner surface will be destroyed and the original billet will be transformed into a hollow piece. The rear end of the piece will accordingly be constantly augmented with new subsidiary sections while its forward end travels through the columnar space and eventually comes into contact with the mold's forward wall. It is of advantage to position in this vicinity a sensor that will emit a signal when the new piece is finished. The piece will now be cooled to solidify it to the extent that the core can be extracted. The extraction constitutes a first step.

It is practical to solidify the piece by subjecting first the core and then the mold to a coolant. The resulting decrease in diameter will accordingly occur initially in the to the core, facilitating its extraction from the mold. Aluminum is preferred for the core because of its comparatively high coefficient of linear expansion. The residual heat is now removed from the newly produced piece. This can be done either through the core or through the newly emptied space. Since the coefficient of linear expansion of plastics is higher than that of metals, a gap will occur at the inner surface of the mold. The hollow piece will now be extremely easy to extract from the mold with a mechanical extractor or fluid, compressed air for example.

The method in accordance with the invention is especially appropriate for processing waste plastic into new products. The waste must be broken up small and thoroughly mixed to be smoothly supplied to the extruder. In addition to the thermoplastic constituents, those based on polyolefins and polyvinyl chloride for example, the blend can contain such non-thermoplastic constituents as mineral fillers and/or waste rubber. The product's color can accordingly be adapted to the requirements of each specific application just as readily as its mechanical, thermal, and chemical strengths can. The starting materials can be of any form—moldings and/or slabs of duroplastic containing vegetable or mineral fibers and imprinted or unimprinted sheet for example.

The extruder in the generic device has in accordance with the invention only one screw. The device that provides the shape constitutes a mold with rigid walls and a core projecting from the end opposite the extruder. Ideally, the rotation will be superimposed over the force that expels the billet. The core can taper in uniformly towards its projecting end.

The ratio between the open diameter D1 of the outlet and the free diameter D2 of the extruder should if at all possible be between 0.3 and 0.8.

It has been demonstrated to be of advantage for the same reason for the outlet to be circular. This feature promotes the desired rotation of the billet around its axis. The ratio between the length and the diameter of the outlet should also be as small as possible and should not exceed 1.

The extruder should if possible not have any degassing device. The bubbles of air or gas expelled from such an embodiment along with the billet are surprisingly not uniformly distributed over the product's cross-section. They are confined to a radially inner vicinity, which is accordingly surrounded by a completely non-porous outer zone. The width of this zone is approximately constant over the circumference, and the zone is optically distinctly different from the inner vicinity. No blowholes can be observed in the vicinity of the surface. The piece's surface can, rather, be of any texture, which is a significant advantage from the aspect of esthetics. The cross-sectional design hereintofore described also means particularly satisfactory buckling and bending strengths in terms of the product's weight. The core is also surprisingly easy to extract.

In addition to the aforesaid type of mold, at least two additional molds can be associated with one extruder, each mold traveling by the extruder's outlet and stopping in front of it as desired. This approach considerably accelerates the manufacturing process in that one mold is always in the emptying position, one in the charging position, and one in the cooling position.

One advantageous embodiment of the invention has only a single core. The core is aligned coaxially with the extruder and moves back and forth along its own axis. An embodiment of this type is cost-effective and operates particularly smoothly because the inside of the hollow piece is immediately accessible to a coolant once the core has been extracted, a situation that accelerates further cooling and solidification.

The individual molds in such an embodiment can revolve in a device that rotates around an axis paralleling the axis of the extruder. This system will simplify the engineering of the drive mechanism that moves the separate molds in relation to one another.

The rotating device can be immersed at least up to its axis in water, with the extruder positioned above the surface of the water next to a receptacle for the pieces. Such a design will be compact and space-saving and will provide an especially satisfactory potential for completely automating manufacture of the products.

A hollow columnar piece in accordance with the invention can have almost any cross-section desired. Not only circular but stellate and polygonal cross-sections can easily be created. The edges of rectangular cross-sections can be of any shape—with convex or concave curves for example. It accordingly becomes possible to produce what is called profile board, which has tongues and grooves that allow it to be joined together into large surfaces, to almost zero tolerance. The ratio of the depth to the width of such pieces can easily be between 1:4 and 1:6.

The outer surface of the core can parallel the inner surface of the mold, allowing high static properties with little material.

Extracting the core from the mold can often be facilitated if the core has a circular cross-section. In addition to tapering in toward its projecting end, it makes sense for its surface to be coated with an antiadhesive material, PTFE for instance. Rotating the core around its axis can also facilitate removing it from the mold. An outside helical thread is also conceivable, making it possible to add to the linear motion a twist that additionally facilitates extraction.

The core can consist of several parts, of independently moving components on at least two opposite sides. Such a design will facilitate extraction even more. It is in this event possible for the two components to rest against each other by way of a sliding wedge that moves independently of either. The wedge can taper in toward its front. The wedge can be removed and the components easily released from the surface of the resulting hollow piece and removed from inside it.

The mold employed in the method in accordance with the invention can be very simple, a thin-walled cylinder of metallic material for example. It is practical not to cool the mold with an ancillary coolant until its inner surface is uniformly wet with constituents of the billet. This approach will ensure that the product will exhibit a consistent inner and outer design over its total length. The product can then be cooled by active means, by directly immersing the mold and its contents in water for example. The product's non-porous outer zone will ensure continuous cooling and solidification of the areas that determine dimensional stability. The piece can soon be removed from the mold, which is a major advantage from the aspect of economics.

The preferred embodiments of the present invention will now be described with reference to the accompanying drawings.

DESCRIPTION OF THE PREFERRED EMBODIMENTS

Figure 1:
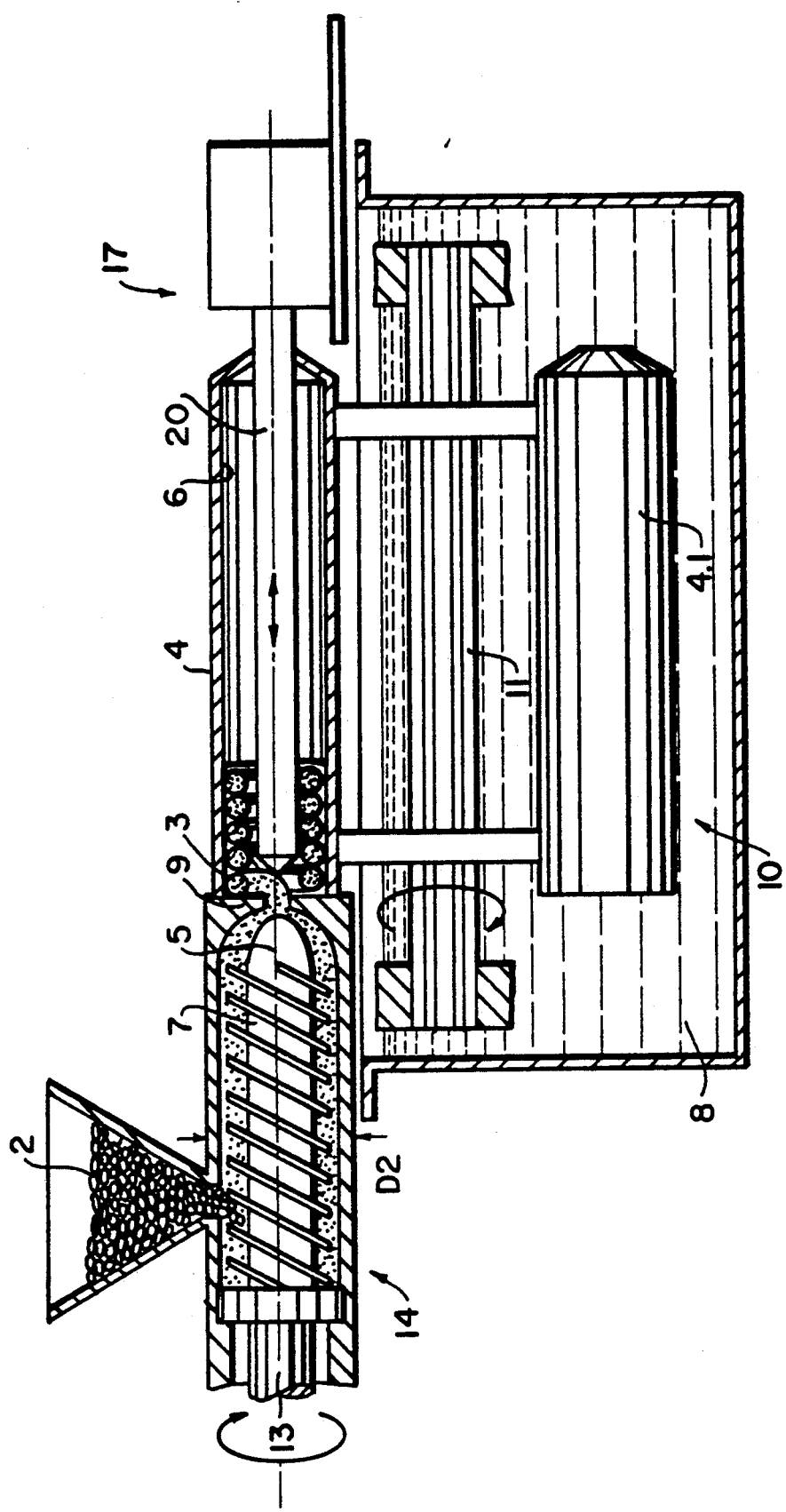
FIG. 1 is a schematic longitudinal section through an example of a device for carrying out the method in accordance with the invention.
Figure 2:
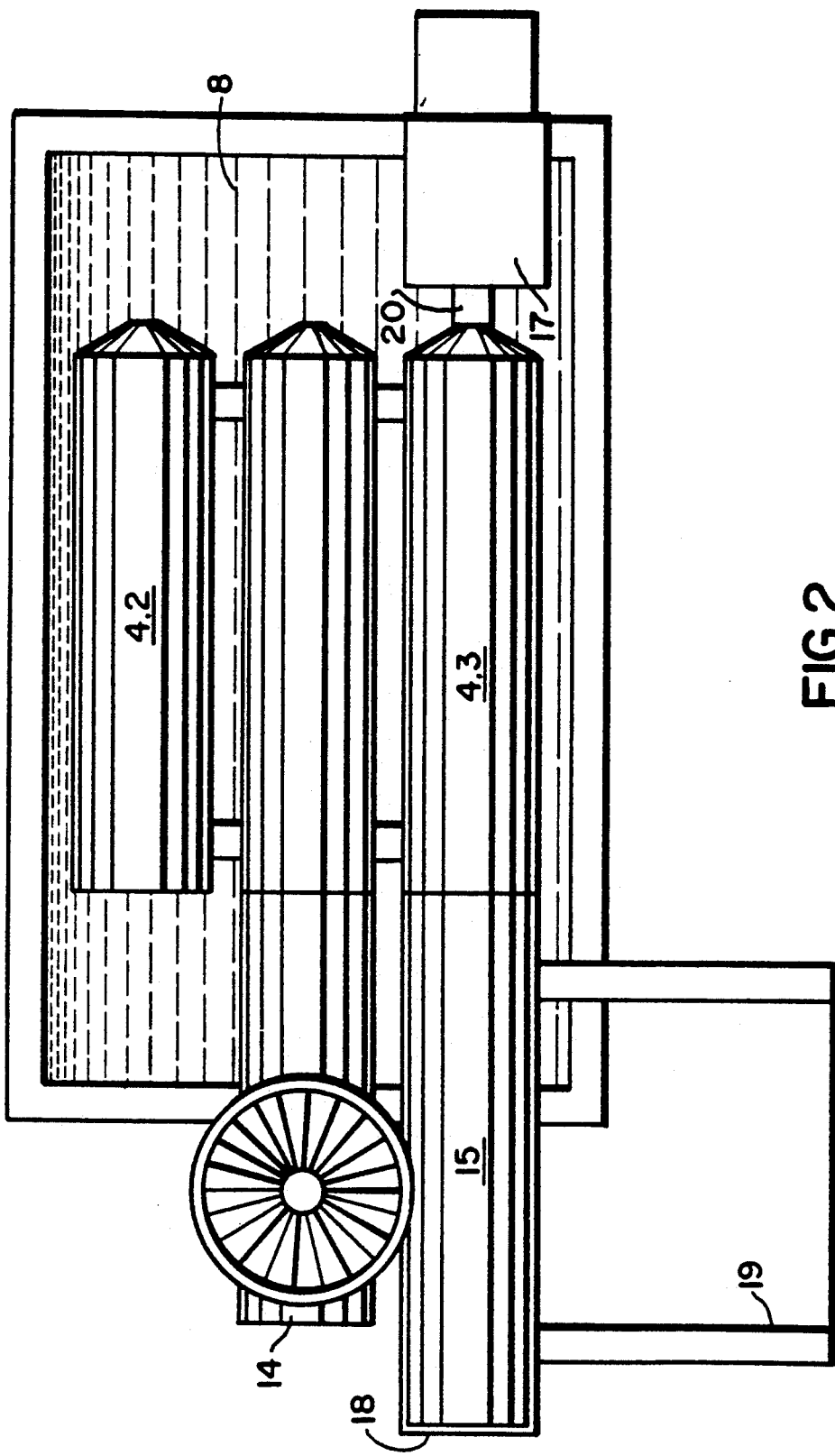
FIG. 2 is a top view of the device illustrated in FIG. 1.

The device illustrated in FIGS. 1 and 2 consists of an extruder 14 positioned above a tub 8 of water.

Extruder 14 has a housing accommodating a screw 7 that rotates on a driveshaft 13. Granulated plastic 2 enters the extruder from a hopper at the left, and the threads around screw 7 force the material constantly to the right. The housing has an inside diameter $D_2$ that decreases to a diameter $D_1$ at the output end in the vicinity of an outlet 9. The plastic 2 that enters from the hopper at the left can accordingly not travel through extruder 14 unaltered but is exposed to thorough kneading, resulting in melting and thorough blending as it travels through the device. The ratio of diameter $D_2$ to diameter $D_1$ is approximately 4. The plastic leaving outlet 9 is accordingly in the form of an essentially homogeneous and viscous billet rotating and traveling toward the right.

Downstream and to the right of extruder 14 is a mold 4 in the form of a thin-walled metal cylinder. The mold is coaxial with outlet 9 and screw 7. It is mounted in a device 10 that secures not only mold 4 but other molds 4.1 to 4.3 as well and rotates around an axis 11 paralleling the axis of extruder 14. The individual molds accordingly revolve past the outlet 9 from the extruder can stop in front of it as desired. The molds in rotating device 10 are all columnar and are charged concentric with the axis from the left end. As long as this latter condition is ensured, they can also have different cross-sections.

At the right of the illustration is an accessory 17. Accessory 17 is mounted on a carriage. Mounted on the accessory is a mold core 20. Core 20 has a round cross-section. The core is coaxial with the extruder and can rotate around its axis. It is made of aluminum. An unillustrated cooling system makes it possible to constantly supply coolant for the purpose of rapidly decreasing the core's outside diameter.

Rotating device 10 is immersed in tub 8 with its axis 11 below the surface of the water. The water can be room-temperature.

Above tub 8 and next to extruder 14 is a receptacle 15 for finished pieces 1, which are in the present case expelled from the occupied mold 4.3 by an unillustrated mechanical extractor. A stop 18 accurately positions the expelled pieces in receptacle 15. The stop can then be pivoted down around its axis (in the plane of projection) to allow the intercepted piece to enter an assembling device 19—a shipping pallet or something similar.

Figure 3:
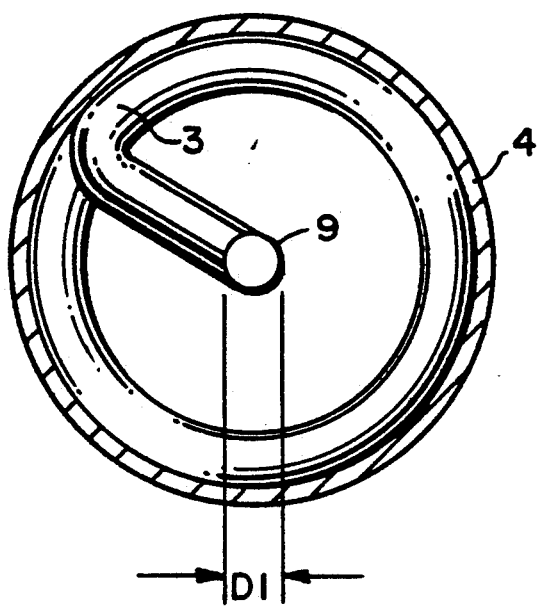
FIG. 3 illustrates the principle involved in introducing the billet into the mold.
Figure 4:
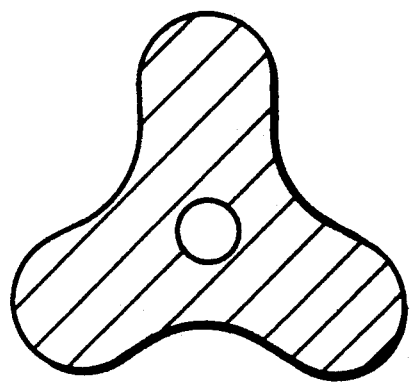
FIGS. 4 through 7 illustrate examples of cross-sections of hollow columnar pieces obtainable with the method in accordance with the invention, and FIG. 8 a longitudinal section and 8A a cross-section through a complex core.
Figure 5:
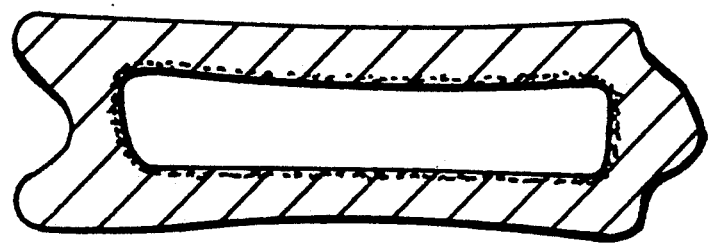
Figure 6:
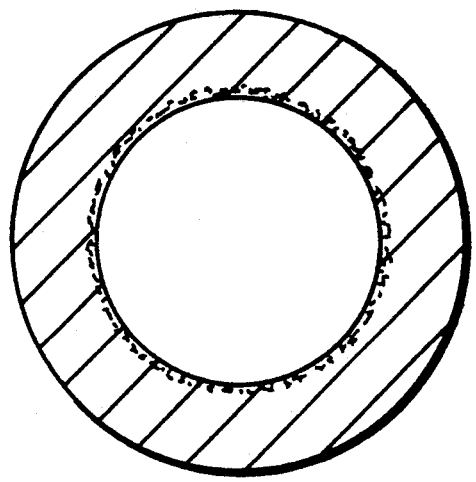
Figure 7:
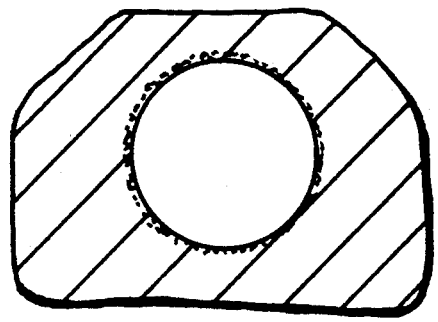

FIG. 3 schematically illustrates how a billet 3 is introduced into a mold 4. Billet 3 arrives through the outlet 9 from extruder 14 rotating around its axis and moving forward toward the center of the downstream end of 10 mold 4, which is surrounded by a rigid inner surface and positioned stationary in relation to outlet 9. At the center of the mold is the core with its circular cross-section. The core is demarcated in the vicinity of its face by a conical surface. Billet 3 is in an easily deformable state and rests subject to gravity initially below outlet 9 against the inner surface or face of mold 4, where a certain mutual adhesion between it and mold 4 occurs due to the billet's adhesive properties. Due to the pressure of additional constituents of billet 3 as they arrive and revolve around its axis, a deposit will continue to occur along the circumference of the space between mold 4 and core 20, resulting in mutual adhesion with inner surface 6 and with the already deposited constituents of billet 3 and core 20. The originally available space between the deposited constituents of billet 3 and outlet 9 will accordingly become completely occupied, and the already deposited constituents will be displaced into still available spaces, creating the initial subsidiary section of the columnar piece. The original adhesion against inner surface 6 and core 20 will simultaneously be destroyed, and, although new constituents of hollow piece 1 will continually come into existence at the left, the right end of the piece will become increasingly displaced to the right in the place of projection. This process will continue until the available space is completely full and inner surface 6 and core 20 are continuously and uniformly wet with constituents of billet 3. The attainment of this state will be indicated by an unillustrated sensor that communicates electrically with a switch that, when said state is attained, interrupts the supply of billets and cools and removes core 20 by rotating it to the right and rotating device 10 around its axis. Hot and charged mold 4 enters the water in tub 8, and charged mold 4.1, which has already been cooled in the water, is positioned for discharging in front of receptacle 15, while another mold, which has already been discharged, is positioned for charging. Once core 20 has been introduced, extruder 14 can be engaged again, and the mold 4.3 in the discharging position discharged, introducing the next cycle.

FIGS. 4 through 7 illustrate different inner and outer cross-sections of hollow columnar pieces manufactured with the method and device in accordance with the invention. Characteristic of all these hollow pieces is that, in addition to an almost non-porous zone around the edge with an essentially constant width, they have almost a foam structure at the radially inner zone. They are strong and resistant to chemicals. The surface is completely intact and can have any desired texture, which is a significant aesthetic advantage. They can easily be scarred to imitate leather or wood.

Figure 8:
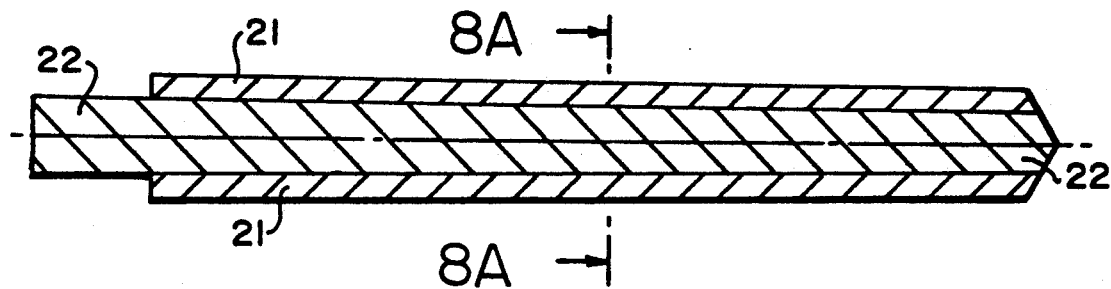
Figure 8A:
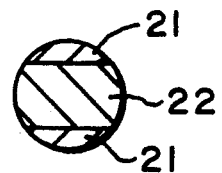

FIG. 8 illustrates a complex core with independently moving components 21 on at least two opposite sides. Such a design will facilitate extraction even more. Components 21 rest against each other by way of a sliding wedge 22 that moves independently of either. Wedge 22 tapers in slightly toward its front. The wedge can accordingly easily be extracted from between components 21. The components can then be easily released from the surface of the resulting hollow piece without any friction. This extensively facilitates their removal by eliminating any problems with adhesion. The antiadhesive coating on the surface of the core in accordance with the invention will accordingly need to be replaced only occasionally.

There has thus been shown and described a novel method of and device for producing a hollow columnar piece which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of producing a hollow columnar-shaped piece whereby a blend of essentially thermoplastic material is melted into a billet, introduced into a mold, looped into layers inside the mold, and transformed into a piece, subsequent to which the piece is solidified by cooling and removed, the improvement wherein a core is arranged in a first mold leaving a space between the core and the inner surface of the first mold, wherein the billet is rotated around its axis while being introduced into one end of the first mold and is thereby deposited along the circumference of the inner surface, and wherein the billet continues to be introduced into the space until the mold's inner surface and core are uniformly and continuously wet with constituents of the billet.

2. The method defined in claim 1, wherein the billet is rotated by the screw in an extruder.

3. The method defined in claim 1, wherein once its inner surface and core are continuously and uniformly wet, the first mold is cooled with auxiliary coolant.

4. The method defined in claim 1, wherein the core is cooled before the mold itself is cooled.

5. The method defined in claim 3, wherein the first mold is cooled by dipping it into a tub of water.

6. In a device producing a hollow columnar-shaped piece having an extruder with a screw and a circular outlet for melting a blend of thermoplastic material and extruding the material through the outlet to form a rotating billet, and means for shaping the piece, wherein the screw, the outlet and the shaping means are coaxial, the improvement wherein the extruder has only one screw; wherein the shaping means comprise a first mold with a rigid inner surface and a rigid core that projects out of the end of the first mold opposite the extruder, thereby providing a space between the inner surface and the core for receiving the billet and forming the hollow piece; and wherein the shaping means further comprise means for extracting the core from the first mold.

7. The device defined in claim 6, wherein the core tapers in uniformly toward its projection end.

8. The device defined in claim 6, wherein the core consists of independently moving components on at least two opposite sides.

9. The device defined in claim 8, wherein the two components rest against each other by way of a sliding wedge that moves independently and tapers in toward its projecting end.

10. The device defined in claim 6, wherein the open diameter D1 of the outlet is 0.3 to 0.8 as long as the open diameter D2 of the extruder.

11. The device defined in claim 6, wherein at least two further molds are provided in addition to the first mold and wherein the molds travel by the outlet from the extruder and can be stopped in front of it as desired.

12. The device defined in claim 6, wherein only a single core is aligned coaxial with the extruder and moves back and forth along its own axis.

13. The device defined in claim 11, wherein the individual molds revolve in a device that rotates around a common axis paralleling the axis of the extruder.

14. The device defined in claim 13, wherein the rotating device is immersed at least up to its axis in a tub of water, with the extruder positioned above the surface of the water next to a receptacle for the pieces expelled from the molds.

15. The method defined in claim 1, wherein the first mold has a circular cross-section.

16. The method defined in claim 1, wherein the first mold has a polygonal cross-section.

17. The method defined in claim 1, wherein the first mold has a stellate cross-section.

18. The method defined in claim 1, wherein the first mold has a rectangular cross-section and a convexity in the vicinity of at least one side.

19. The device defined in claim 6, wherein the first mold has a circular cross-section.

20. The device defined in claim 6, wherein the first mold has a polygonal cross-section.

21. The device defined in claim 6, wherein the first mold has a stellate cross-section.

22. The device defined in claim 6, wherein the first mold has a rectangular cross-section and a convexity in the vicinity of at least one side.

23. The method defined in claim 1 wherein the first mold has a rectangular cross-section and a concavity in the vicinity of at least one side.

24. The device defined in claim 6, wherein the first mold has a rectangular cross-section and a concavity in the vicinity of at least one side.

* * * * *